United States Patent [19]

Hodgson et al.

[11] Patent Number: 5,699,520

[45] Date of Patent: Dec. 16, 1997

[54] FLOW CONTROL APPARATUS AND METHOD FOR A COMPUTER INTERCONNECT USING ADAPTIVE CREDITS AND FLOW CONTROL TAGS

[75] Inventors: Robin Hodgson, Redwood City, Calif.; Alan Davis, Coalville, Utah

[73] Assignee: Hewlett-Packard Company, Palo Alto, Calif.

[21] Appl. No.: 296,215

[22] Filed: Aug. 25, 1994

[51] Int. Cl.$^6$ ..................................................... G06F 7/00
[52] U.S. Cl. .............................. 395/200.13; 395/200.11; 395/435
[58] Field of Search .......................... 395/200.13, 200.11, 395/435; 370/60

[56] References Cited

U.S. PATENT DOCUMENTS

| | | | |
|---|---|---|---|
| 5,010,516 | 4/1991 | Oates | 365/49 |
| 5,088,091 | 2/1992 | Schroeder et al. | 370/94.3 |
| 5,193,151 | 3/1993 | Jain | 395/200.06 |
| 5,253,248 | 10/1993 | Drauida et al. | 370/16 |
| 5,282,270 | 1/1994 | Oppenheimer et al. | 595/200.11 |
| 5,493,566 | 2/1996 | Ljungberg et al. | 370/60 |

FOREIGN PATENT DOCUMENTS

| | | | |
|---|---|---|---|
| 0219049A2 | 4/1987 | European Pat. Off. | H04L 11/20 |
| 0281757A2 | 9/1988 | European Pat. Off. | G06F 15/16 |
| 0577359A2 | 1/1994 | European Pat. Off. | H04L 12/56 |

OTHER PUBLICATIONS

Dixon et al, "Data Link Switching: Switch-to-Switch Protocol", IBM, RFC 1434, Mar. 1993 pp. 1–33.

Cerf, Kahn; "A Protocol for Packet Network Intercommunication"; IEEE Transactions on Communications, vol. COM–22, No. 5, May 1974, pp. 637–648.

Sendix: Datensuche im Eiltemp. In: Electronik Oct. 1992, pp. 50–62.

Primary Examiner—Mehmet B. Geckil

[57] ABSTRACT

A flow control mechanism for packet-switched computer interconnect relates a packet in the interconnect to another packet in the interconnect by one or more various means. A packet is deemed stalled if it is stuck inside a switch packet buffer waiting to be forwarded due to unavailability of appropriate output ports. When an incoming packet begins to arrive, the switch checks to see if its internal packet buffers already contain a related packet that is currently stalled. If so, the switch immediately rejects the incoming packet. The incoming packet is only accepted if there are no related packets stalled inside the receiver. A switch may simultaneously contain several related packets that are in the process of being forwarded, but it may never contain more than one stalled packet. Adaptive routing is also limited by the assignment of adaptivity credits to each packet.

7 Claims, 6 Drawing Sheets

FLOW CONTROL APPARATUS AND METHOD FOR A COMPUTER INTERCONNECT USING ADAPTIVE CREDITS AND FLOW CONTROL TAGS

BACKGROUND OF THE INVENTION

1. Technical Field

The present invention relates to the exchange of information between computers that are interconnected in a computer network. More particularly, the present invention relates to a method of interconnect flow control that manages the allocation of interconnect packet buffer resources to promote general efficiency and fairness of access among the users of the interconnect in a computer network.

2. Description of the Prior Art

One problem that limits the exchange of information between computers that are interconnected in a computer network is that the interconnect is not explicitly protected against the effects of global saturation. Saturation should not be confused with deadlock. Deadlock occurs when an interconnect is unable to make any forward progress with delivery of any of the data contained in the interconnect. By definition, deadlock is a permanent condition. Saturation occurs when interconnect performance, for example message latency or bandwidth at a node, degrades to an unacceptable level.

Computer programs written for single user, parallel computer architecture machines typically arrange to have the various parallel machine elements cooperate for the use of interconnect resources. Saturation effects are not a major issue in such machines because saturation typically results from bad programming practices for the particular machine architecture.

In a multiuser, multicomputer environment, control of interconnect saturation effects becomes more important. While a single user environment consists of a single cooperating program which shares the interconnect resources, a multiuser multicomputer environment consists of a group of unrelated processes that continually compete for the scarce interconnect resources. Thus, the general problem of interconnect flow control is exacerbated in computer systems that are based on competition for interconnect usage as opposed to computer systems that cooperate for interconnect usage. In a cooperating system, the system software can be carefully designed to avoid situations that cause problems for a network switch. In systems based on competition for scarce resources, there is no way to predict interconnect usage patterns.

One known approach to interconnect resource management provides a global flow control mechanism at the hardware level. The problem with this approach is that global flow control implies an exchange of traffic information on a global scale. There are significant network costs associated with implementing and managing such global control. For example, network performance is adversely affected because the exchange of information consumes time and interconnect bandwidth. Additionally, an interconnect management mechanism involving the exchange of global traffic information does not scale well. That is, as the interconnect is increased in size, traffic information carried over the interconnect is more likely to be stale by the time it is propagated to a useful location.

Packet switching is a method of communication in which messages are exchanged between terminating equipment, such as switches or computers, via the exchange of a sequence of fragments of the message that are referred to as packets. Packet switched computer interconnects are typically constructed from a collection of individual switch elements that are connected together to form a switch fabric.

FIG. 1 is a block level schematic diagram of one possible mesh topology showing a computer network and the computer network interconnect 10. FIG. 2 is a block level schematic diagram showing network connections to a node in the computer network of FIG. 1.

Each node is a switch element, e.g. those elements identified by numeric designators 11 and 12, that contains two or more packet buffers. FIG. 3 is a block level schematic diagram showing a buffer arrangement used in the node of FIG. 2. The use of packet buffers 31, 32, 33 makes it possible for a switch element 11 to route multiple packets that are received at the switch to a neighboring switch element 12 via the same connection over which the packets were received. In such a case, the switch routes one of the packets out of the switch, while the remaining packets are stored within the packet buffers. When the desired connecting link becomes free again, the switch element forwards another packet over the link from one of the packet buffers. The process repeats until all of the packets stored in the packet buffers are forwarded.

Packet buffers represent a basic interconnect resource. If more free buffers are available throughout the network fabric at any given time, it is more likely that the network fabric can route packets to their destinations with a minimum amount of delay. Unfortunately, under certain traffic conditions the supply of buffers within a packet switch can become exhausted. When this happens, the performance of the packet switch is degraded such that little, if any, useful work is accomplished by the switch.

Consider a case where a sender client is inserting packets faster than a receiver client is removing them. At each packet switch along the route from the sender client to the receiver client, packets are arriving faster than they are leaving. Over a period of time, this consumes the supply of packet buffers within each switch along the route. While this consumption of intermediate switch buffers may not necessarily cause a problem for the particular sender client and receiver client in question, it may cause problems for any other sender/receiver client pair that are trying to use the same packet switches. This problem occurs because the resources required to forward the packets for the second and subsequent communicating client pairs are completely consumed by the original sender/receiver client pair.

One known method for controlling interconnect flow is to ignore messages that cannot be buffered for lack of switch resources. In this method, if the traffic load consumes all of the available packet buffer resources at a switch, the switch discards any incoming packet that it cannot buffer.

Other schemes require each individual switch element to keep track of the amount of packet buffer space available in neighboring switch elements. Packets are not forwarded out of a switch unless buffer space is known to exist in the adjacent switch. This ensures that packet is not discarded, but it does not ensure that one sender/receiver client pair may not consume all of the packet switch/buffers.

Thus, early packet switch research taught the use of strictly local knowledge to accomplish interconnect flow control. The only information that a switch element needed for flow control was that information which indicated whether or not its adjacent neighbor switches were too busy to accept new packets. This approach has the advantage that this information is exchanged quickly and cheaply. This limited amount of information is enough to provide adaptive routing around local hot spots within the network fabric.

Global saturation still occurs using this approach for at least the following reasons:

Sender clients are permitted to inject packets continually into an already congested network fabric mesh. It is possible that one single sending client can consume the entire interconnect bandwidth and buffer space.

A single sender client that is sending packets to a node which refuses to remove the packets from the network for any reason, e.g. because of failure or because the node is busy, can cause the packets to back up inside the interconnect. The sending node, through no fault of its own, may not be able to detect this until the interconnect had exhausted all of its internal resources right back to the injection point.

A group of sender clients could conspire to send messages to a single target. Because the maximum rate at which a single node can remove packets from the interconnect is much less than the potential aggregate rate at which multiple sender clients can inject packets into the interconnect toward that single node, the interconnect resources would become exhausted.

The foregoing problems are exacerbated when the algorithm used to route packets between the sender client and the receiver client is adaptive in nature because adaptive algorithms allow packets to travel in directions that do not make constant forward progress, e.g. to route packets around faults or areas of congestion in the switch fabric. Thus, a particular sender/receiver client pair can also consume network fabric resources in areas of the network fabric that are not in a direct path between the sender client and the receiver client.

An adaptive credit routing mechanism has been proposed for use in limiting global interconnect saturation. This approach limits both the number of nodes and the location of nodes that can be flooded by a particular individual sender. The set of affected nodes along the path from the sender client to the receiver client are defined as a plume. The size of the plume is directly related to the number of credits that are issued to each packet of a message. Thus, if more credits are issued to a packet, a bigger plume results; while in-order delivery, i.e. a single path from the sender client to receiver client, produces a smaller plume.

The foregoing method does not require a global flow control mechanism, and it is therefore simple and fast. In addition, it allows the interconnect to route a packet around hot spots located inside that portion of the subplume where adaptation is allowed. Unfortunately, if a receiver client is inattentive or overworked, the intermediate nodes inside the plume are still eventually consumed, resulting in plume saturation. Even if a particular plume is saturated, the rest of the interconnect might remain unaffected and available for useful work. However, the saturated plume would interfere with traffic that either needed to cross it or reach a target inside of it.

Such interconnect flow control problems limit resources available to a network user and prevent the most efficient, fair, and orderly use of a network interconnect, especially where there is no mechanism for allocating resources among the many network users.

SUMMARY OF THE INVENTION

The invention is based on a new concept, i.e. that of related packets. Packets are defined to be related to each other if there is some reason to consider the group of packets as part of some greater entity. The concept of relatedness can manifest itself in a variety of ways. For example, a group of packets may be considered to be related if they are subparts of a single message. Packets could also be defined to be related if they originated from the same computer, or even if they originated from a different computer, but are all targeted at the same destination computer.

A packet is stalled if it is stuck inside a switch packet buffer waiting to be forwarded due to unavailability of appropriate output ports. When an incoming packet begins to arrive, the switch checks to see if its internal packet buffers already contain a related packet that is currently stalled. If so, the switch immediately rejects the incoming packet. The incoming packet is only accepted if there are no related packets stalled inside the receiver. A switch may simultaneously contain several related packets that are in the process of being forwarded, but it may never contain more than one stalled packet. In simple terms, if a switch already contains a request to do something that it is currently unable to do, the invention does not allow the switch to accept another packet requiring an identical operation. Thus, the other buffers inside the switch remain free to be allocated to do things that may still be possible, i.e. process cross traffic through a stalled plume.

Once a previously stalled packet begins to leave a switch, its associated buffer continues to be marked as stalled until such time as the sender client knows that the receiver client can not reject the packet due to buffer allocation problems. This prevents the sender client from accepting another similar packet until it is sure that it is actually able to forward the one it already has. Thus, the invention puts a hard limit on the number of packet buffers that any given related data stream can allocate within the interconnect. Allowing a single stalled buffer per intermediate switch is enough to ensure that the performance benefits from pipelining effects are not lost. As soon as a forwarding operation finishes, a stalled packet may be forwarded and a new related packet may be simultaneously accepted to become the next stalled packet.

From the point of view of flow control, the invention herein begins to throttle the sender client under congested conditions much faster than any previous method. In fact, when in-order delivery is used, the congestion effects propagate back to throttle the sender in minimal time.

Delivery and ejection performance are not compromised by the invention because a switch inside the plume only rejects packets when it already contains stalled packets. Thus, the plume fills just as rapidly as with the original methods. Under light load conditions, intermediate switch nodes may be able to support multiple simultaneous forwarding operations which rapidly fills the plume. At some point, stalled packets may begin to appear in the plume propagating from the destination back to the source. When the injection switch contains a stalled related packet, it refuses to accept any more related packets for injection into the interconnect, effectively throttling the injection process. As the destination node removes packets, the fact that each node in the plume may already contain a stalled packet ensures that pipelining effects begin immediately as required.

DETAILED DESCRIPTION OF THE INVENTION

Figure 1:
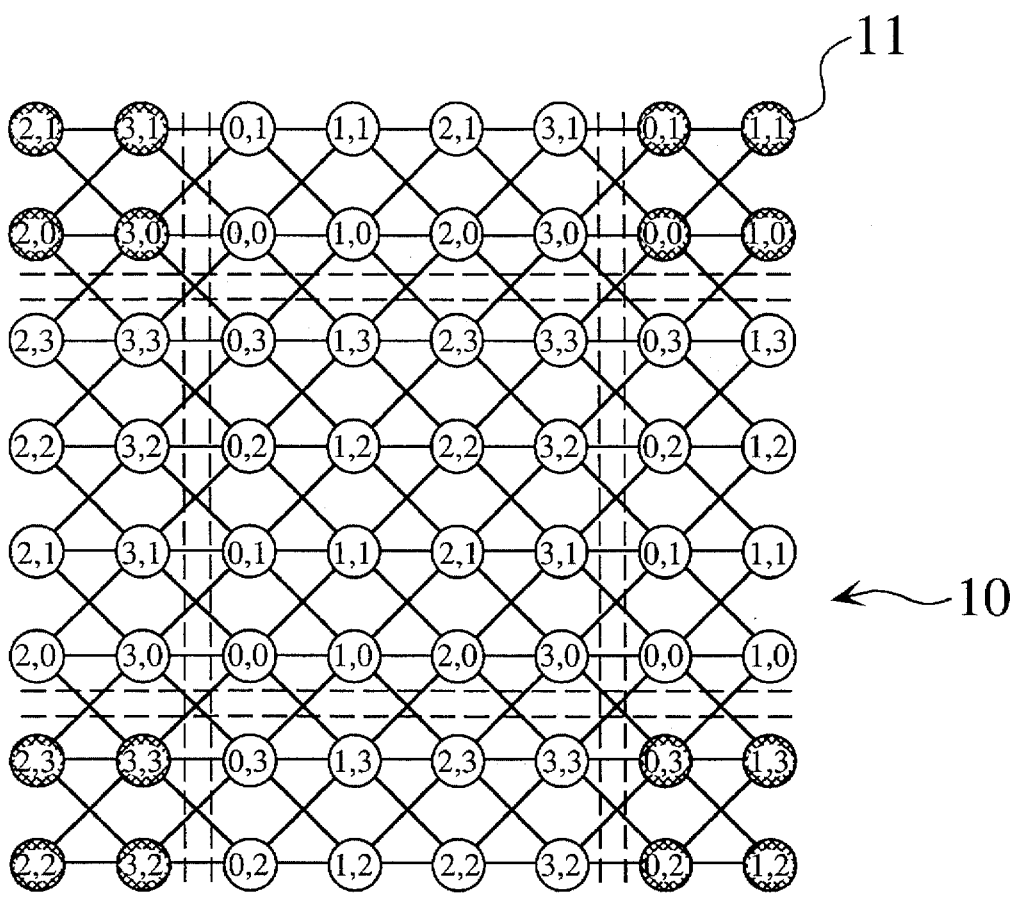
FIG. 1 is a block level schematic diagram of a diagonal mesh topology showing a computer network and the computer network interconnect.
Figure 2:
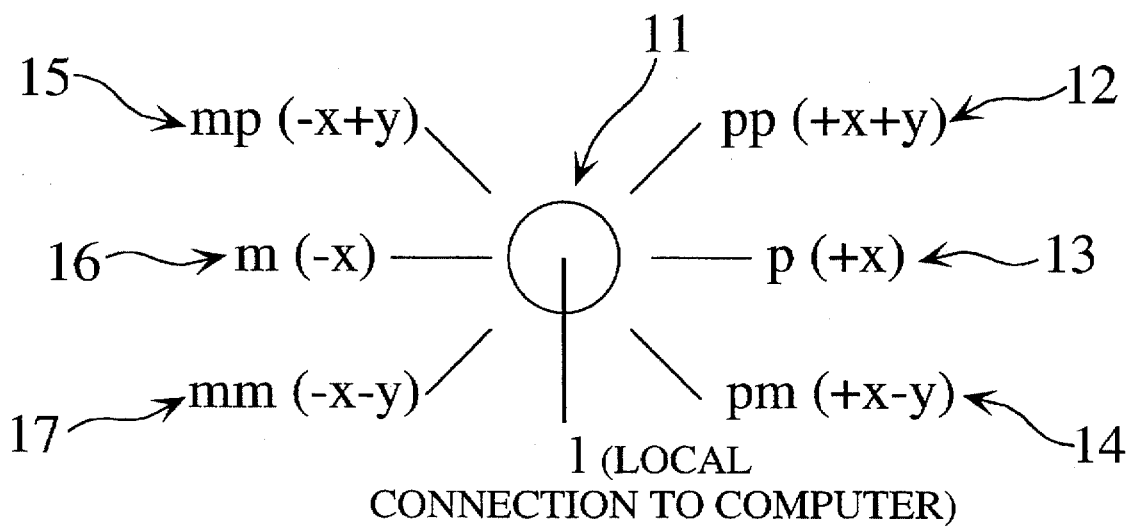
FIG. 2 is a block level schematic diagram showing network connections to a node in the computer network of FIG. 1.
Figure 3:
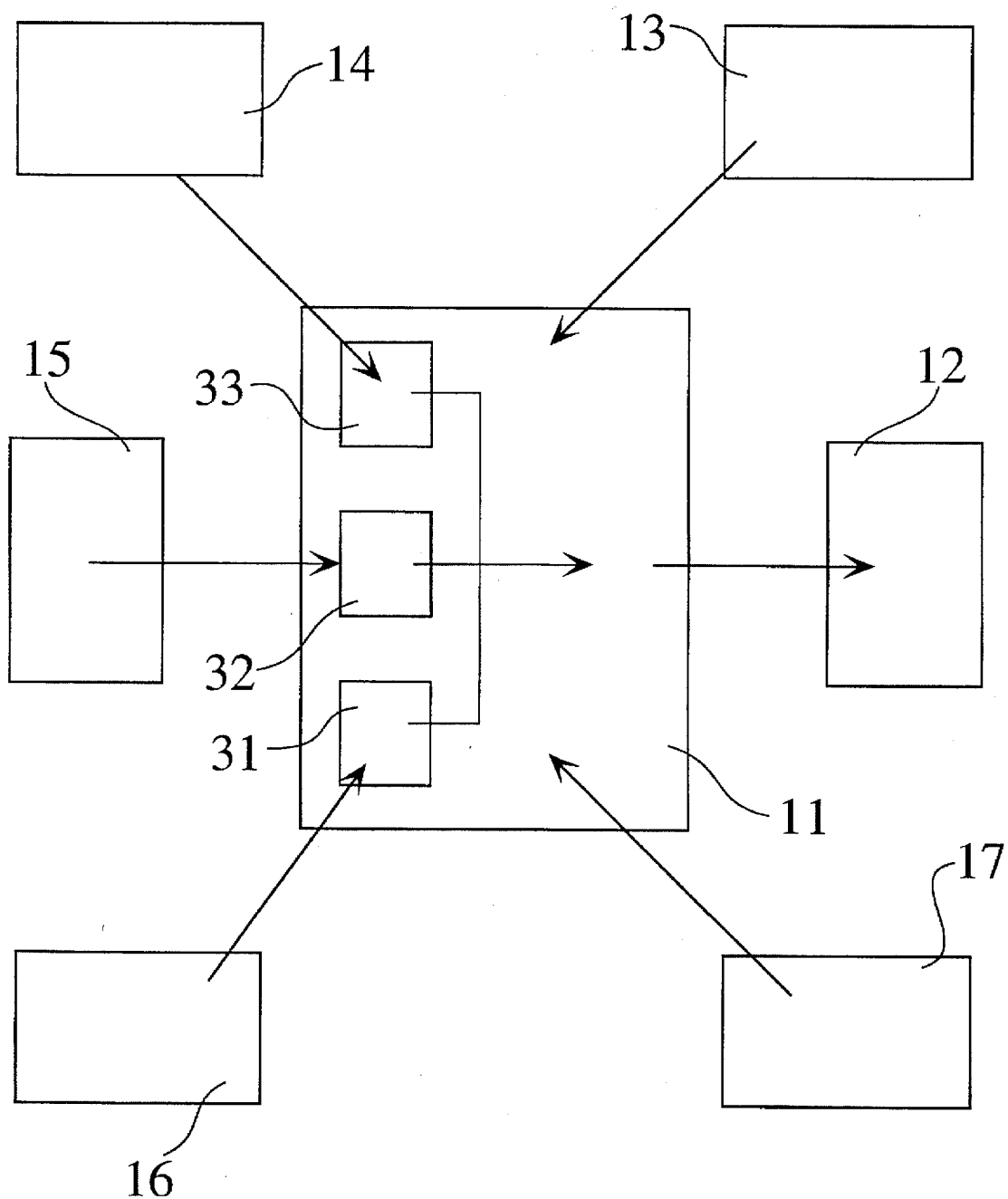
FIG. 3 is a block level schematic diagram showing a buffer arrangement used in the node of FIG. 2.

The invention provides a method of computer network interconnect flow control in which the interconnect hardware constrains the amount of general interconnect resources that are available to any given interconnect user. The method constrains the adaptivity of packets moving through the switch fabric. Such adaptivity can improve interconnect performance under certain interconnect traffic patterns. However, if such adaptivity is unconstrained the packets can be routed far from their destination. This roundabout packet routing interferes with other traffic in the network fabric. In the worst case, unconstrained adaptivity allows a single sender/receiver client pair to consume all of the available packet buffers in the network fabric. One aspect of the invention avoids the foregoing problem by limiting adaptivity, referred to herein as damped adaptivity.

A damped adaptive router requires that the header of each packet routed through the interconnect contain a field referred to as the adaptive credit count. When a packet is injected into the fabric for transmission, the injecting hardware or software writes a numeric value into the adaptive credit count corresponding to the initial credit. If the value of the credit count is positive upon entering a packet switch, the switch is allowed to forward the packet in an adaptive manner. If the field is zero, the packet switch is constrained to route the packet in a nonadaptive manner.

The credit count may be decremented in at least one of at least two fashions, i.e. whenever the packet switch forwards a packet via an adaptive route, or whenever a packet is forwarded via any route. In either case, picking the initial value of the credit count to be less than the maximum diameter of the switch fabric limits the number and location of the set of packet switches that could possibly be visited by packets from a particular sender/receiver client pair. The set of packet switches that could be visited is referred to as the "plume". Placing a small initial value in the adaptive count field in relation to the diameter of the interconnect produces a smaller plume.

Using the adaptive credit mechanism, a single sender client sending to a single receiver client cannot use up more interconnect resources than are contained within the adaptive plume of the packet switches between the sender client and the receiver client. Sender/receiver client plumes that do not overlap can communicate without any contention. A sender client is still allowed to consume all of the fabric resources within the plume. This is not always desirable because it is likely that cross traffic from another sender/receiver pair will overlap another plume, and therefore compete for resources within the area described by the intersection of the two plumes.

To solve this problem, the packet switch in the invention constrains the number of packet buffers that are available within a particular plume. The invention provides a mechanism in which a switch that contains a packet that it cannot currently forward, i.e. a stalled packet, is not required to accept another incoming packet that requires the same forwarding operation, for example for a packet that is somehow related to the stalled packet. This mechanism limits the number of packet buffers within a switch that may hold packets from the same plume.

Figure 4:
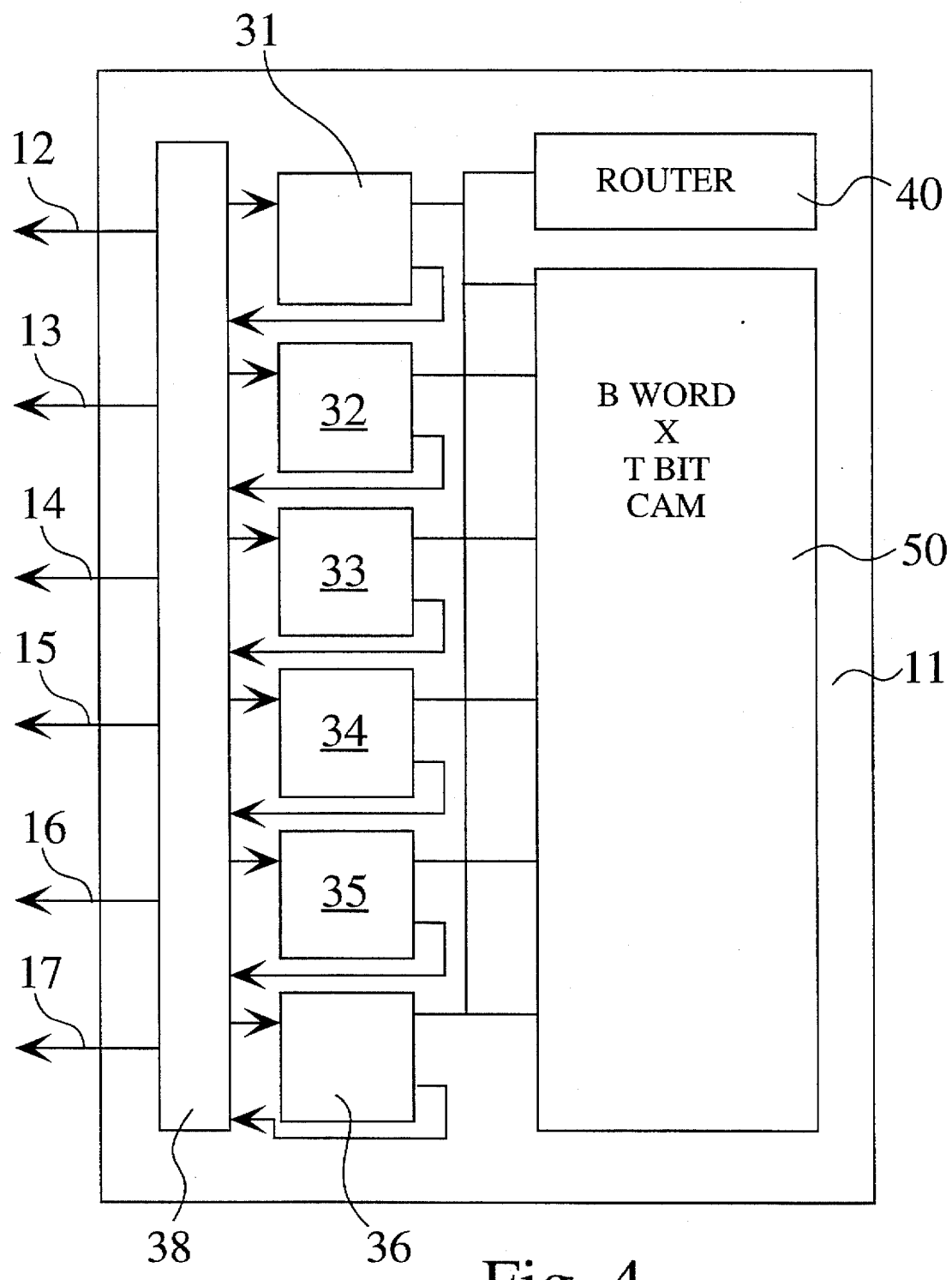
FIG. 4 is a block level schematic diagram of a flow control mechanism for a packet-switched computer network interconnect according to the invention.

FIG. 4 is a block level schematic diagram of a flow control mechanism for a packet-switched computer network interconnect according to the invention. In the figure, a switch is shown having a number of connections to a network, which in turn connect the switch to other nodes 12–17 in the network. Each network connection is connected to a series of switch packet buffers 31–36 via a cross bar switch 38. A router 40 connected to the packet buffers coordinates the receipt of traffic at, and forwarding of traffic through, the switch such that packets are forwarded to the appropriate destination. A content addressable memory (CAM) 50 is arranged to hold the packet relationship tag for each packet in each packet buffer. In this way, a buffer containing a stalled packet stores a packet relationship tag in the CAM, indicating that any incoming packet having a matching tag should be refused by the switch.

Figure 5:
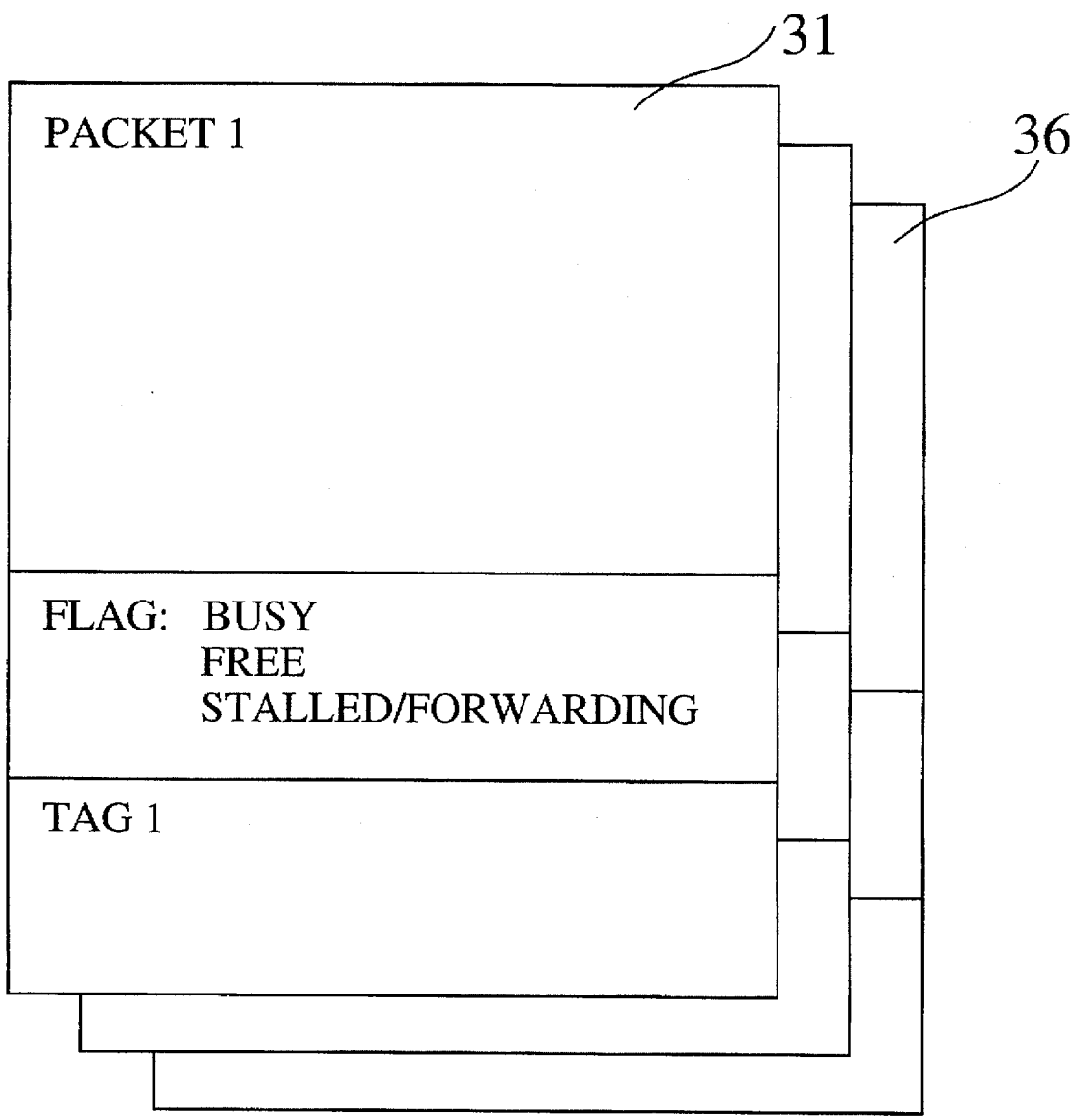
FIG. 5 is a block level schematic diagram of a switch packet buffer for the packet-switched computer network interconnect shown in FIG. 4.

FIG. 5 is a block level schematic diagram of a packet switch buffer of the packet-switched computer network interconnect shown in FIG. 4. Each packet buffer 31, 36 includes a sufficient amount of storage capacity to hold a packet.

Additionally, the packet buffers hold the packet relationship tag, and a flag that indicates the packet buffer status, i.e. busy, free, stalled/forwarding.

Thus, the invention provides an element that generates information about the packet contained in the packet buffers, and includes a mechanism in the packet switch that analyzes the information, and thereby regulates the flow of incoming packet traffic.

The invention also includes a mechanism that adds state information to each packet buffer in a switch element. This information indicates whether there is a packet inside a buffer or not. If a buffer contains a packet, the mechanism also generates state information that indicates whether the packet is currently being forwarded, or if it is stalled in the buffer and waiting to be forwarded.

Next, the mechanism associates a tag with each packet buffer in a packet switch. In actuality, the tag is a numeric value. The values assigned to the tag field define the relationship between packets, i.e. like values represent related packets, while unlike values represent unrelated packets. The actual values chosen to represent particular relationships are a matter of choice, except that there should be mutual agreement on the values by the various users of the interconnect. The tag defines the relationship code of the packet in the buffer. A tag may be based on, but is not limited to:

1) the sender's unique ID;

2) the sender's unique ID in combination with the receiver's ID;

3) the receiver's unique ID; or 4) a unique message ID that identifies a related stream of packets as belonging to the same message.

An alternative embodiment of the invention adds a special tag field within the packet header that is constructed by the system hardware or software before the packet is initially injected into the switch fabric.

It is important to consider that, in many cases, a switch is not capable of understanding the concepts that are used to relate packets to each other. Indeed, there is no reason that the switch would ever need to understand anything except the rules that relate to moving data in the interconnect. All that the switch really needs to have is a method of comparing relationship tags contained in the packets to see if they are the same. This is the reason that a special tag field is included in this embodiment of the invention.

An additional embodiment of the invention splits the tag field into two or more smaller tag subfields. These subfields act in the same manner as the large single field tag, except that the match outputs from the tag subcomparisons may be logically ANDed or ORed together to make more complicated comparisons possible. If the subfields are ANDed together, the result makes the overall possibility of matching less restrictive. If the subfields are ORed together, the possibility of matching becomes more restrictive.

To illustrate the foregoing consider the following: one tag field is used to define various types of traffic, e.g. priority level: high, medium, or low, and the other tag field is used in one of the manners described above. If the matches from the tag subfields are ANDed together to generate a final match signal, the final match would effectively require that packets be related in the manner specified by the second tag field AND that they have the same priority level. If an OR operation is performed on the tag subfields, the switch would reject any packets that belonged to the same traffic type. In the example regarding traffic types, an OR operation ensures that a switch never devotes all of its buffers to a single traffic type.

In each case, the tags represent a means of grouping packets that are normally considered separate entities into a set of related packets to accomplish flow control. The tag generation and checking mechanisms are known, and therefore are not discussed in detail herein. The basic elements of the invention include:

1) Switch packet headers must contain either information that the switch could use to construct a tag, or an explicit tag constructed by an external agent.

2) Switch packet buffers need a flag that marks them as stalled or as being forwarded.

3) The switch must contain a CAM (Content Addressable Memory) having an entry for each packet buffer. The data stored in the CAM corresponds to the tag information contained in the header. The CAM must enable a fast check of the stalled packet buffers to determine if the tag in question already existed. The size of the CAM is minimal because it only needs space one entry per packet buffer.

A receiving switch must support some sort of nondestructive means of rejecting incoming packet traffic. This means that if the sending switch has a packet transfer rejected by the receiving switch, the sender retains the original packet data so that it may try again at some later point in time.

Figure 6:
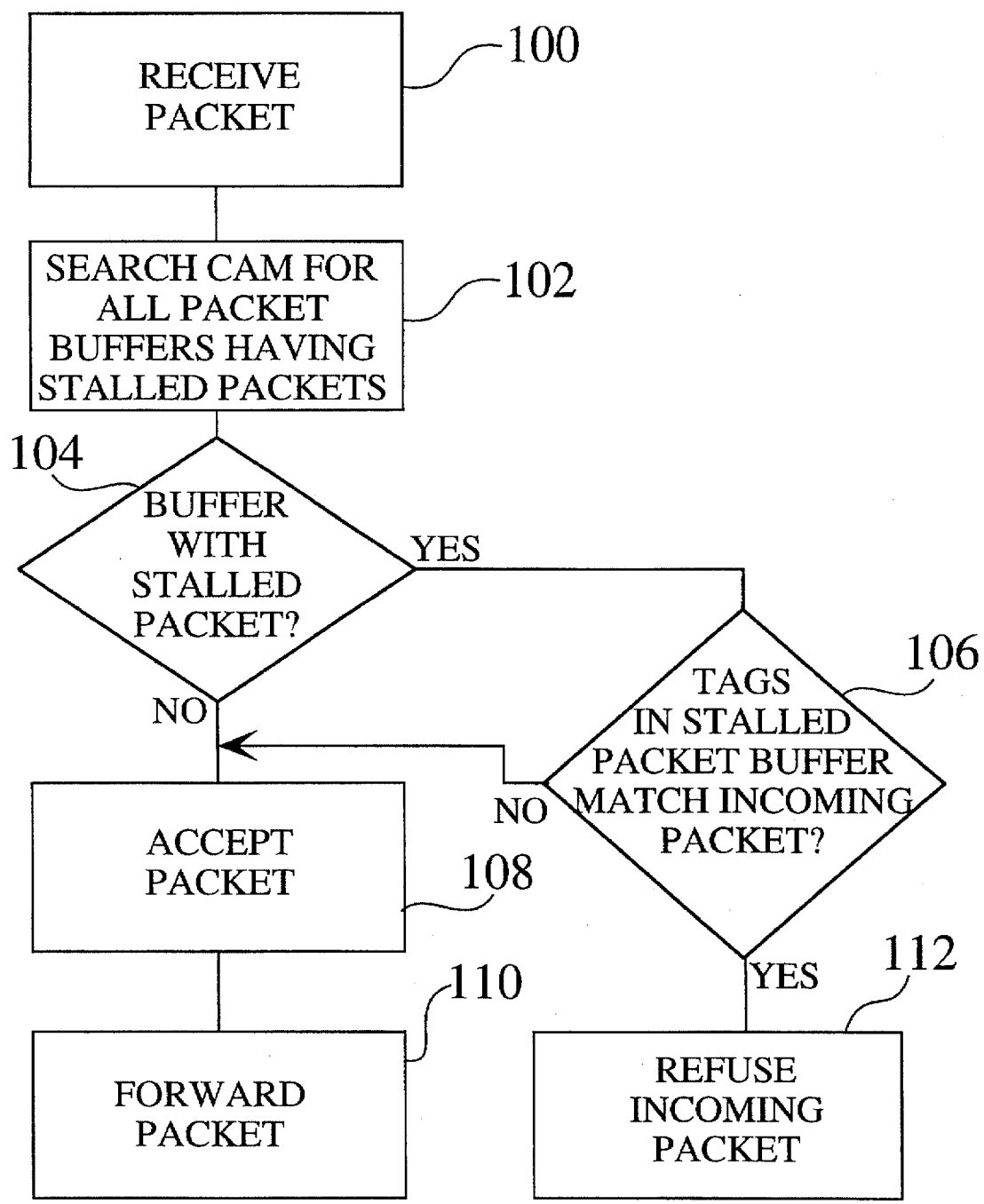
FIG. 6 is a flow diagram for a flow control mechanism for a packet-switched computer network interconnect according to the invention.
Figure 7:
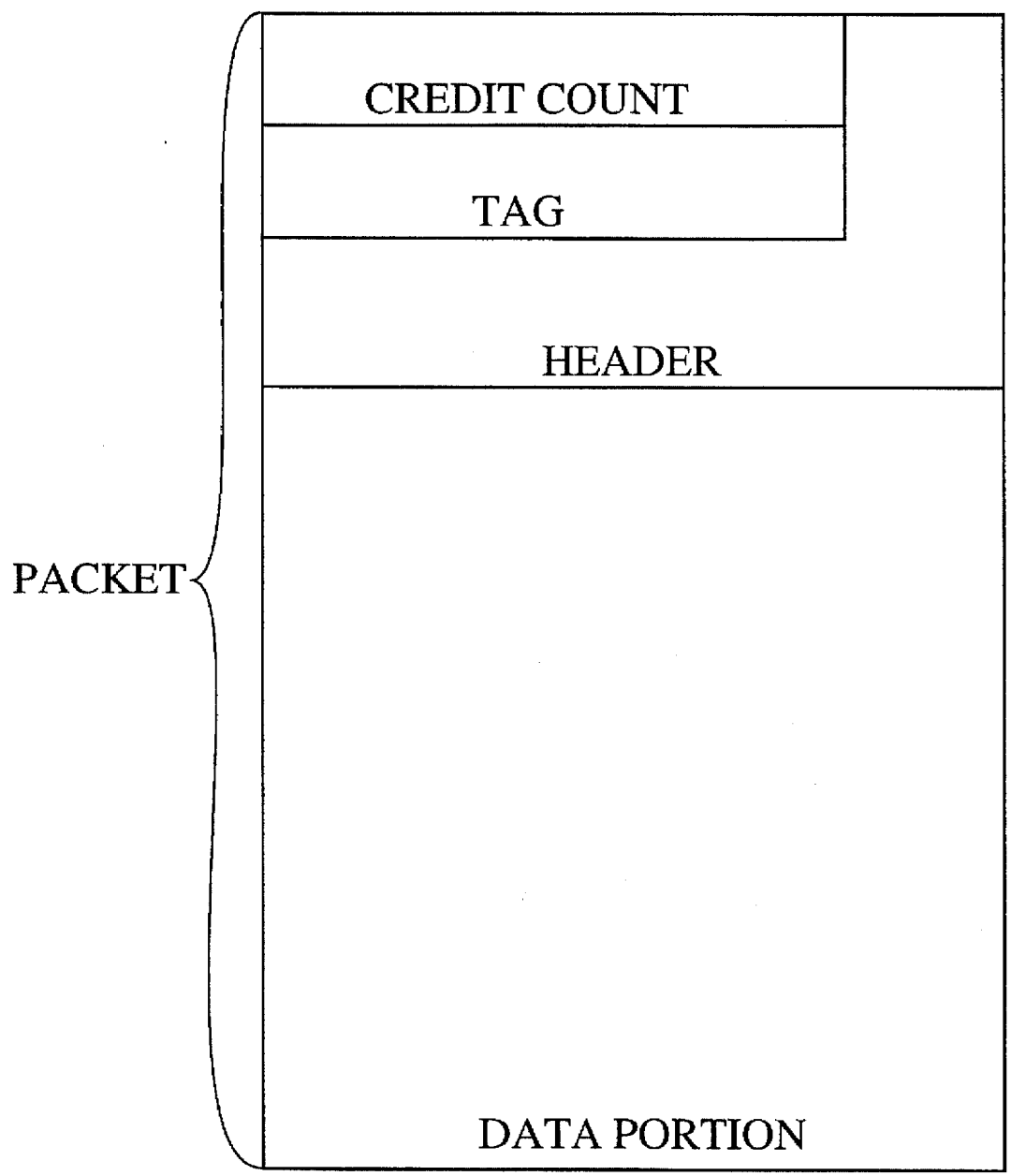
FIG. 7 shows the format of a packet that includes a credit count field and a tag field.

FIG. 6 is a flow diagram for a flow control mechanism for a packet-switched computer network interconnect according to the invention. The inventive congestion control mechanism operates as follows: when a packet arrives (100), the receiving switch searches the set of all of its packet buffers that currently contain stalled packets (102). The preferred embodiment of the invention employs a B word by T bit Content Addressable Memory (CAM), where B is the number of buffers in the switch and T is the number of bits in the tag. If there are no buffers with stalled packets (104), or if those buffers containing stalled packets do not match the tag of the incoming packet (106), the packet switch accepts the incoming packet (108) and attempts to forward the packet to its destination (110). If a packet buffer exists that contains a stalled packet with tag that matches the incoming packet's tag, the packet switch refuses to accept the incoming packet (112). The packet is not dropped by the sender, it is just not accepted by the receiver switch, possibly causing the packet to stall at the sender.

By refusing to accept the packet, the switch causes a plume to form because subsequent packets begin to stall within some of the upstream switches. If the condition persists long enough for the packets to stall all the way back to the injection point, the switch at the injection point can use the same mechanism to refuse accepting injection packets. This acts as a back pressure signal for the overall flow control mechanism.

One of the advantages provided by the invention over the prior art is that the mechanism herein is not required to drop packets when the interconnect gets busy. When the fabric is heavily loaded, the back pressure from the flow control system keeps traffic from entering the fabric. This improves performance by keeping traffic that can not be routed out of the fabric, thereby allowing more of the interconnect resources to be used to forward packets in a useful manner.

One advantage of the invention herein over the credit based schemes discussed above allows the interconnect a fine grain method of allocating its packet buffer resources because the packet tag field described represents an extremely flexible method of defining the sorts of interconnect packet traffic that should be considered by a switch element as being parts of the same piece of metatraffic. Credit based schemes can only provide a method of determining whether or not the basic buffer resources exist in their neighbors.

The invention herein also allows an interconnect designer to tune the flow control mechanism for the traffic loads. The size of the plume can be adjusted via the adaptive credit count. Larger plumes mean more adaptivity, but a longer time before the back pressure signal propagates back to the injection point. Picking appropriate tags to define the relationship between packets specifies a limit on the amount of buffer resources that any given switch can use at any other given switch. A more specific definition of the relation between the various packets allows more resources to be consumed in other switches. Thus, an interconnect designer can tune the parameters to best suit expected traffic loads.

Some considerations with regard to fine tuning the chosen implementation of the invention include:

If every packet injected into the interconnect fabric contains a unique tag, the tags never have any flow control effects and the fabric acts in the same manner as a traditional interconnect, with all of the same problems.

The most restrictive tag scheme provides a tag that is the same whenever a packet is injected anywhere in the fabric. In this case, no switch may contain more than one stalled packet and one forwarding packet.

In more realistic applications of the invention, tags are selected such that the number of unique tags describing the set of packets floating around the fabric is roughly the same as the total number of buffers in the fabric divided by two because each tag can consume two buffers, i.e. one stalled buffer and one forwarding buffer. In actual practice, it is useful to allow slightly more tags than are in simultaneous use because it can be advantageous to allow temporary traffic overloads. If the overload persists, the flow control mechanism herein described eventually shuts it down.

The value of the invention herein is apparent when it is seen how well the invention resolves the various causes of network saturation. Consider the following problems:

1) Senders injecting packets into an already congested mesh:

Improved: As long as the switch at the point of injection is capable of forwarding the packets being inserted for a particular destination, the switch permits the packets to be injected. By definition, if the switch is able to for forward the packets, it is not particularly congested. As soon as the switch contains one packet from a message that gets stalled, further injection is throttled.

2) A single sender capable of using up the total interconnect resource:

Cured: The invention herein enables setting hard limits to the amount of interconnect resource accessible to a single sender.

3) A single sender sending to a slow receiver:

Greatly Improved: a much lower quantity of interconnect buffers are tied up before the congestion effects throttle the sender. In the case of in-order packet delivery, a minimum number of buffers are tied up.

4) Multiple senders sending to a single target:

Improved: In the worst case, if enough senders exist in enough places in the interconnect, their plumes can be made to overlap on enough intervening nodes to cause saturation in those nodes. In a more likely case, plumes do not overlap enough to cause complete saturation.

In a common case where the multiple senders have prior knowledge that they are to send data to a single receiver, the situation is improved even more. In this case, if the sender's arrange to use a common tag for all of their individual replies, the set of packets heading to the receiver is treated as related, even though the packets came from different senders. Additionally, the plumes do not overlap, but actually merge, thereby enhancing the overall flow control effect of the invention.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A flow control apparatus for an adaptive packet-switched computer interconnect having a plurality of adaptive packet switches, comprising:
   (A) a packet relationship tag associated with each packet in the computer interconnect, wherein packets having a common relationship are associated with the same packet relationship tag;
   (B) a control circuit in any one of the adaptive packet switches, the control circuit comprising (I) a content addressable memory (CAM) in any one of the adaptive packet switches, wherein the CAM stores the packet relationship tag of a stalled packet stored in a buffer in that packet switch, and (II) a comparator circuit that compares the packet relationship tag of an incoming packet with the packet relationship tag of the stalled packet stored in the CAM to determine if the packet relationship tag of the incoming packet matches the packet relationship tag of the stalled packet, wherein the control circuit causes that packet switch to refuse to accept the incoming packet when the comparator circuit matches the packet relationship tag of the incoming packet with that of the stalled packet stored in that buffer in that packet switch to constrain that packet switch from storing any additional packets having a common relationship with the stalled packet until the stalled packet is forwarded from the packet switch.

2. The flow control apparatus of claim 1, wherein the control circuit further comprises a packet buffer status flag that indicates whether the buffer stores the stalled packet.

3. The flow control apparatus of claim 1, wherein the packet relationship tag is selected from a group comprising a sender client identification, a receiver client identification, a sender client and receiver client identification, a packet stream identification.

4. The flow control apparatus of claim 1, further comprising
   (I) an adaptive credit count in each packet that includes an initial value less than a total number of the packet switches of the computer interconnect;
   (II) a circuit in that packet switch to cause the incoming packet to be adaptively forwarded when the adaptive credit count of the incoming packet is greater than zero, wherein the circuit of that packet switch causes the incoming packet only to be directly forwarded from that packet switch when the adaptive credit count of the incoming packet is equal to or less than zero, wherein the circuit decreases the adaptive credit count of the incoming packet whenever the circuit causes the incoming packet to be forwarded.

5. A method of controlling packet flow in an adaptive packet switched computer interconnect that includes a plurality of adaptive packet switches, comprising the steps of:
   (A) associating a packet relationship tag to each packet in the computer interconnect, wherein packets of a common relationship are associated with the same packet relationship tag;
   (B) providing a control circuit comprising (I) a content addressable memory (CAM) in any one of the adaptive packet switches, and (II) a comparator circuit;
   (C) storing in the CAM the packet relationship tag of a stalled packet stored in a buffer in the adaptive packet switch having the CAM;
   (D) comparing with the comparator circuit the packet relationship tag of an incoming packet received in the adaptive packet switch having the CAM with the packet relationship tag of the stalled packet stored in that packet switch; and
   (E) the control circuit causing that packet switch to refuse to accept the incoming packet into that packet switch when the comparator circuit matches the packet relationship tag of the incoming packet with that of the stalled packet stored in that buffer in that packet switch to constrain that packet switch from storing any additional packets having a common relationship with the stalled packet until the stalled packet is forwarded from the packet switch.

6. The method of claim 5, further comprising the steps of
   (I) associating an adaptive credit count with each packet, wherein the adaptive credit count includes an initial value less than a total number of the packet switches of the computer interconnect;
   (II) allowing (1) the incoming packet in that packet switch to be adaptively forwarded when the adaptive credit count of the incoming packet is greater than zero, and (2) the incoming packet to be only directly forwarded when the adaptive credit count of the incoming packet is equal to or less than zero, wherein the adaptive credit count of the incoming packet is decreased whenever the incoming packet is forwarded.

7. The method of claim 5, wherein the packet relationship tag is selected from a group comprising a sender client identification, a receiver client identification, a sender client and receiver client identification, a packet stream identification.

* * * * *